United States Patent
Ahn

[11] Patent Number: 5,772,141
[45] Date of Patent: Jun. 30, 1998

[54] TAPE TENSION CONTROLLING/ADJUSTING DEVICE FOR USE IN A VIDEO CASSETTE RECORDER

[75] Inventor: Seong-Ick Ahn, Seoul, Rep. of Korea

[73] Assignee: Daewoo Electronics Co., Ltd., Rep. of Korea

[21] Appl. No.: 848,201

[22] Filed: Apr. 29, 1997

[30] Foreign Application Priority Data

Apr. 30, 1996 [KR] Rep. of Korea ................... 1996-13765

[51] Int. Cl.⁶ .................................................. G11B 15/43
[52] U.S. Cl. ......................................................... 242/334.6
[58] Field of Search .......................... 242/334.6; 360/71, 360/74.3, 85, 95

[56] References Cited

U.S. PATENT DOCUMENTS 5,167,380 12/1992 Choi ....................................... 242/334.6
5,445,337 8/1995 Kwon ................................... 242/334.6
5,625,509 4/1997 Matsuoka ............................... 360/74.3

FOREIGN PATENT DOCUMENTS 58-118052 7/1983 Japan ................................. 242/334.6
2308720 7/1997 United Kingdom .

Primary Examiner—John P. Darling
Attorney, Agent, or Firm—Pennie & Edmonds LLP

[57] ABSTRACT

A tape tension controlling/adjusting device for use in a video cassette recorder provided with a deck and a supply reel comprises a tension lever rotatably mounted on the deck to be biased toward the tape by a coil spring and having a tension pole coming into a contact with the tape, a band holder mounted on the tension lever and including a cylindrical body and a lug shaft eccentrically extending from the cylindrical body, and a band brake including a film and a felt portion attached to the film, wherein the band brake is retained around the cylindrical body at its one side by a fixing tool and the other side thereof is mounted around the supply reel.

3 Claims, 3 Drawing Sheets

TAPE TENSION CONTROLLING/ADJUSTING DEVICE FOR USE IN A VIDEO CASSETTE RECORDER

FIELD OF THE INVENTION

The present invention relates to a tape tension controlling/adjusting device for use in a video cassette recorder; and, more particularly, to a tape tension controlling/adjusting device employing therein a caterpillar type band brake.

DESCRIPTION OF THE PRIOR ART

Generally, in a video cassette recorder, the tension of a tape running between the take-up reel and the supply reel must constantly controlled or adjusted depending on an operating made thereof at a desired level. For this reason, various types of tape tension controlling/adjusting devices have been proposed and used to controlling/adjusting or adjust the tension of the running magnetic tape.

One of the prior art tape tension controlling/adjusting devices is illustrated in FIG. 1. In the illustrated device, after a magnetic tape T is arranged onto a predetermined travel path between a supply reel 11 and a take-up reel (not shown), a tension lever 1 pivotally mounted on a deck at a hinge 3 is permitted to be biased toward the magnetic tape T by a spring 4. In response to the tension lever 1 pivotting, a tension pole 2 mounted on a distal end of the tension lever 1 rotates toward the running magnetic tape T, as represented with an arrow, to press the same T, thereby taking a band brake 5, whose one end is connected to the tension lever 1 through a moving band holder 6, into an operative position of the band brake 5. At the operative position, the band brake 5 exerts a braking force on the supply reel 11 in response to a further rotation of the tension lever 1. The band brake 5 is supported by a fixed band holder 7 at the other end thereof which is mounted on the deck. The fixed band holder 7 is provided with a band length adjustment 8 through which the worker in manufacturing line of the video cassette recorder set the length of the band brake 5.

In the illustrated tape tension controlling/adjusting device described above, however, since the band brake is designed to be supported at two different positions, two band holders separated from each other are needed, thereby rendering the device to be complicated.

SUMMARY OF THE INVENTION

It is, therefore, a primary object of the invention to provide a tape tension controlling/adjusting device having a band brake supported by one band holding member.

The above and other objects of the invention are accomplished by providing a tape tension controlling/adjusting device for use in a video cassette recorder provided with a deck and a supply reel comprises: a tension lever rotatably mounted on the deck to be biased toward the tape by a resilient means and having a tension pole coming into a contact with the tape; a band holder mounted on the tension lever and including a cylindrical body and a lug shaft eccentrically extending from the cylindrical body; and a band brake including a film and a felt portion attached to the film, wherein the band brake is retained around the cylindrical body at its one side by a fixing means and the other side thereof is mounted around the supply reel.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Figure 1:
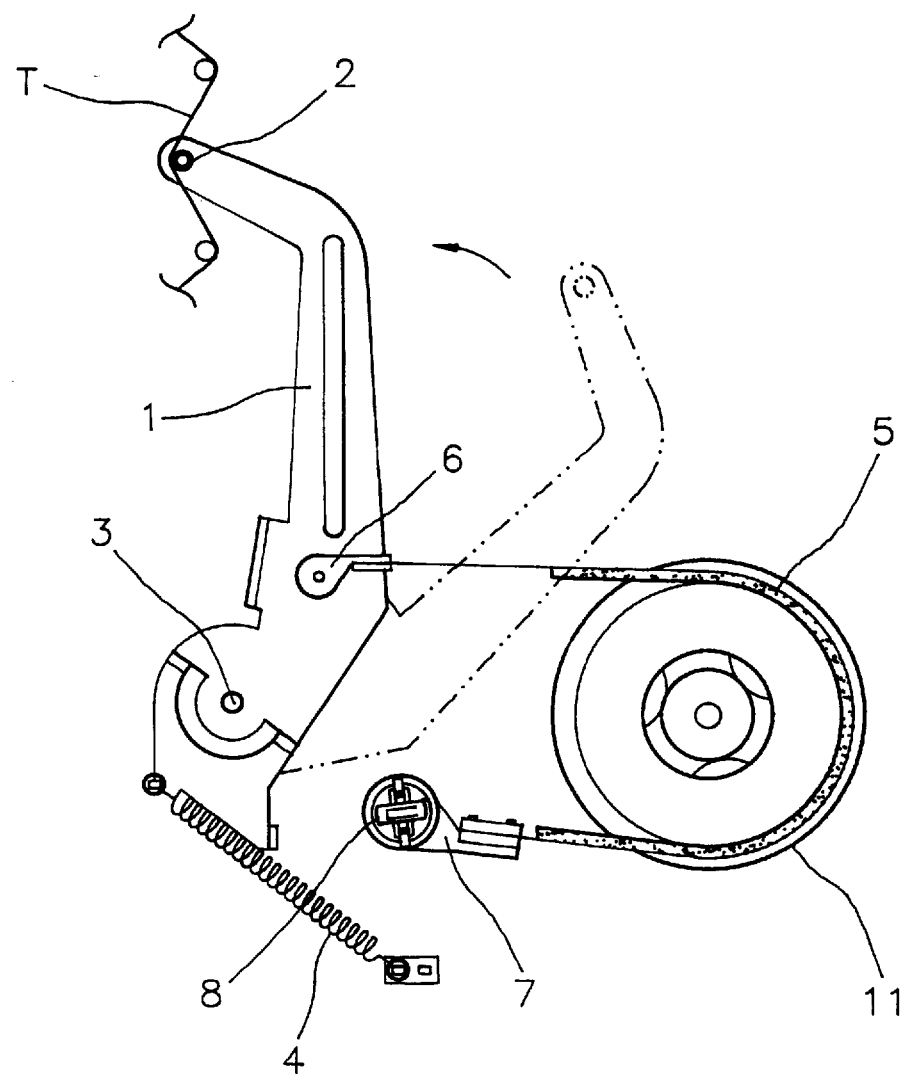
FIG. 1 shows a top plan view of a prior art tape tension controlling/adjusting device.
Figure 2:
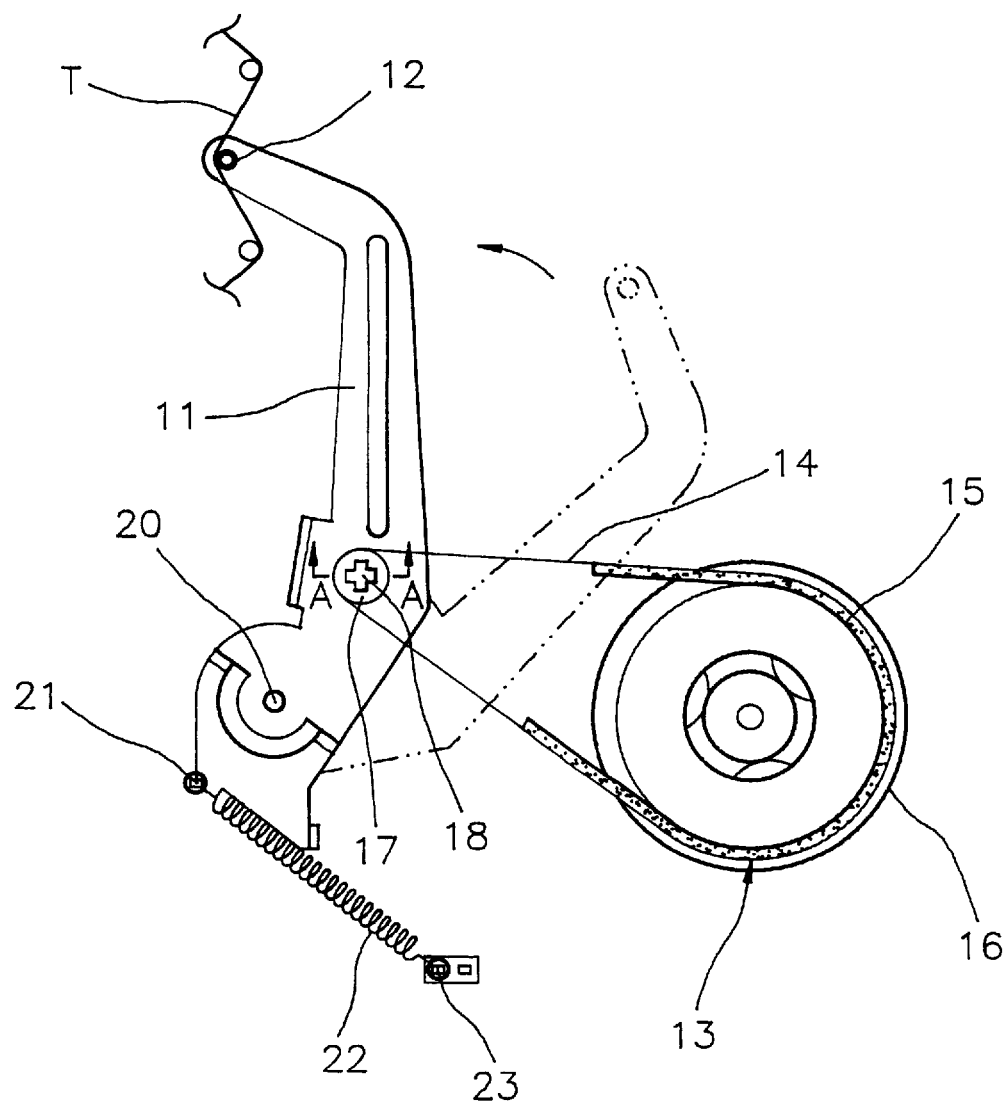
FIG. 2 illustrates a top plan view of a tape tension controlling/adjusting device in accordance with the present invention.

Referring to FIG. 2, the inventive tape tension controlling/adjusting device for use in a video cassette recorder is largely divided into a tension lever 11 and a band brake 13. The tension lever 11 is pivotably mounted on a deck (not shown) at a hinge 20. The tension lever 11 has a spring hook seat 21 at its proximal end through which a coil spring 22 is retained to the tension lever 11 at its one end. The other end of the coil spring 22 is retained to a protuberance 23 on the deck to allow the coil spring 22 to urge the tension lever 11 to rotate counterclockwise on the deck. Vertically installed on a distal end of the tension lever 11 is a tension pole 12 which serves to press a running magnetic tape T.

The band brake 13 includes a film base 14 and a felt-shoe 15. The film base 14 is of an endless caterpillar configuration which is mounted around a band holder 17 on the tension lever 11 and a supply reel 16. The felt-shoe 15 is attached on a part of the film base 14 and serves as a friction surface with the supply reel drum when the band brake 13 applies a braking force on the supply reel 16.

Figure 3:
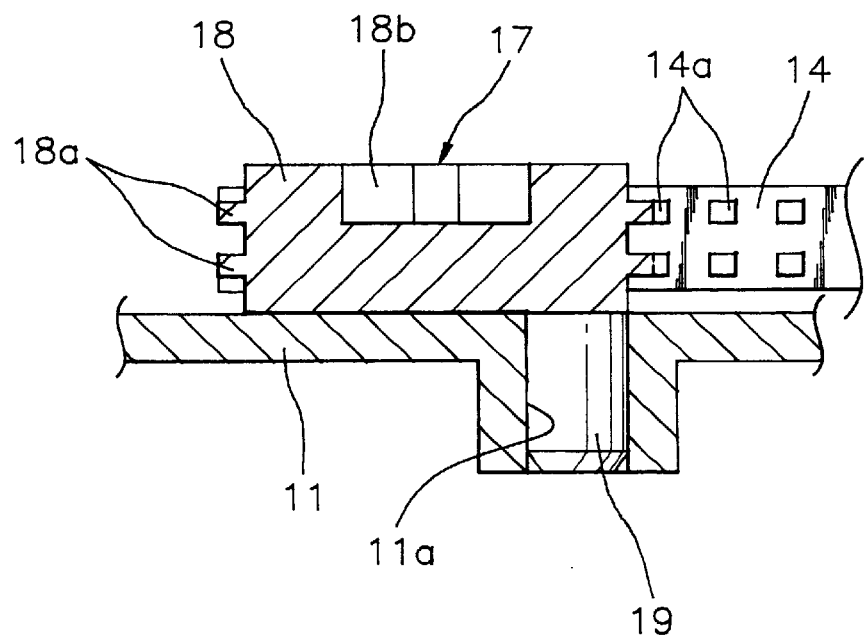
FIG. 3 depicts a elevational sectional view, when taken along a line A—A in FIG. 2, showing a band holder employed in the inventive tape tension controlling/adjusting device.
Figure 4:
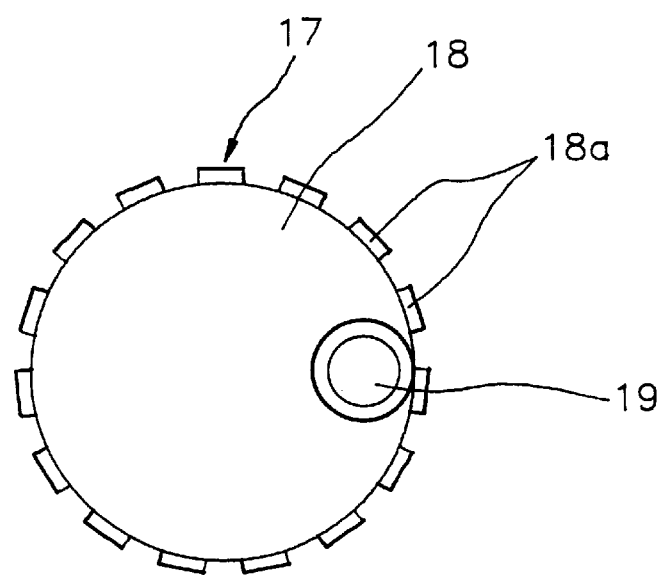
FIG. 4 represents a bottom plan view of the band holder used in the inventive tape tension controlling/adjusting device.

A detailed description of the band holder 17 is now made with reference to FIGS. 3 and 4.

As shown in FIGS. 3 and 4, the band holder 17 is provided with a circular body 18 and a lug shaft 19. The circular body 18 has two series of protuberances 18a formed therearound and a cross groove 18b formed on top thereof. In one series of the protuberances 18a, each of the protuberances 18a is angularly equally separated from each other along a periphery of the circular body 18. The protuberances 18a are engaged into a plurality of perforations 14a formed through the film base 14.

The lug shaft 19 eccentrically extends from the circular body 18 and is closely fitted into a through hole 11a on the tension lever 11.

An operation of the inventive tape tension controlling/adjusting device designed in this manner is described with reference to FIGS. 2 through 4.

Initially, since, e.g., a mode change moving plate (not shown) located beneath the deck hinders the counterclockwise rotation of the tension lever 11, the latter 11 is forced to be positioned at a retreated position, as represented by a phantom line in FIG. 2, till the magnetic tape T is completely loaded onto its travel path from a tape cassette (not shown) inserted into the video cassette recorder. When the tape loading operation is completed and the magnetic tape T starts to run, the mode change moving plate permits the tension lever 11 to be rotated by the coil spring 22 and the tension pole 12 comes into a contact with the running magnetic tape T. At the same time, the band brake 13 is arranged on its applying position around the supply reel 16. In this set-up, when the tape tension becomes lowered, rotating the tension lever 11 counterclockwise, the band brake 13 in response to the tension lever 11 applies the braking force on the supply reel 16 to thereby cause a slowdown of a rotating speed of the supply reel 16. When the tape tension is increased, allowing the tension lever 11 to be rotated clockwise, the band brake 13 releases the supply reel 16, restoring the normal rotating speed of the supply reel 16. That is, the band brake 13 starts to apply the braking force on the supply reel 16 whenever the tension pole 12 is further rotated counterclockwise from its threshold angular position, whereas no braking force is exerted by the band brake 13, when the tension pole 12 stays in an angular position rotated clockwisely from the threshold angular position.

Furthermore, the inventive band holder 17 closely fitted into the tension lever 11 through the lug shaft 19 can adjust the threshold angular position of the tension lever 11. That is, if the band holder 17 is rotated with respect to the tension lever 11 by applying, e.g., a screwdriver on the cross groove of the cylindrical body 18, the distance between the band brake 13 and the tension lever 11 is changed due to the eccentric feature of the lug shaft 19 with respect to the cylindrical body 18. As a result, the threshold angular position of the tension lever 11 is adjusted.

Although the invention has been shown and described with respect to the preferred embodiments, it will be understood by those skilled in the art that various changes and modifications may be made without departing from the spirit and scope of the invention as defined in the following claims.

What is claimed is:

1. A tape tension controlling/adjusting device for use in a video cassette recorder provided with a deck on which a magnetic tape runs along a predetermined travel path and a supply reel, said device comprising:

a tension lever rotatably mounted on the deck to be biased toward the magnetic tape by a resilient means and having a tension pole coming into a contact with the magnetic tape;

a band holder mounted on the tension lever and including a cylindrical body and a lug shaft eccentrically extending from the cylindrical body;

a band brake including a film and a felt portion attached to the film, wherein the band brake is retained around the cylindrical body at one side of the band brake and the other side thereof is mounted around the supply reel; and a fixing tool for retaining said band brake around the cylindrical body, the fixing tool including at least one series of protuberances formed on the cylindrical body along a periphery of the cylindrical body and a same number of series of perforations formed through the film.

2. The tape tension controlling/adjusting device of claim 1, wherein the cylindrical body has a cross groove formed thereon.

3. The tape tension controlling/adjusting device of claim 1, wherein the resilient means is of a coil spring.

* * * * *